United States Patent [19]
Van Den Brink

[11] Patent Number: 5,815,918
[45] Date of Patent: Oct. 6, 1998

[54] METHOD FOR REPLACING AN ELECTRICALLY CONDUCTING CABLE BY ANOTHER ELECTRICALLY CONDUCTING CABLE

[75] Inventor: Robertus Franciscus Maria Van Den Brink, Leiden, Netherlands

[73] Assignee: Koninklijke PTT Nederland N.V., The Hague, Netherlands

[21] Appl. No.: 710,953

[22] Filed: Sep. 24, 1996

[30] Foreign Application Priority Data

Oct. 26, 1995 [NL] Netherlands ............................ 1001239

[51] Int. Cl.⁶ .................................................... H01R 43/00
[52] U.S. Cl. ............................ 29/868; 29/402.08; 29/593; 29/869; 379/20; 379/21
[58] Field of Search ......................... 29/868, 869, 402.08, 29/593, 828; 336/221; 379/20, 21, 27, 345; 439/509

[56] References Cited

U.S. PATENT DOCUMENTS

| | | | |
|---|---|---|---|
| 2,430,451 | 11/1947 | Carr et al. .................................. | 29/868 |
| 3,975,600 | 8/1976 | Marston ...................................... | 379/21 |
| 4,162,815 | 7/1979 | Fleinchhacker ........................... | 439/509 |
| 4,590,336 | 5/1986 | Ray et al. ................................... | 379/20 |
| 4,817,282 | 4/1989 | Markwardt ............................. | 29/869 X |
| 5,282,157 | 1/1994 | Murphy et al. ...................... | 379/345 X |
| 5,365,578 | 11/1994 | Buzbee et al. ......................... | 379/21 X |

OTHER PUBLICATIONS

N. Komatsu et al., "Technology of Cable Transfer System for Error–Free Digital Transmission", *Electronics and Communications in Japan*, Jul. 1988, No. 7, Part 2, vol. 71, pp. 84–93.

*Primary Examiner*—Peter Vo
*Attorney, Agent, or Firm*—Young & Thompson

[57] ABSTRACT

Method for replacing a first cable (1) by a second cable (2) between a first predetermined point (1a) and a second predetermined point (1b), comprising:
  a. the provision of first series impedance means (S1) close to the first end (2a) and second series impedance means (S2) close to the second end (2b) of the second cable (2), which first (S1) and second (S2) series impedance means can be switched between a state of high impedance value and a state of low impedance value;
  b. electrically connecting the second cable to the first cable (1) at the first (1a) and second (1b) points, during which operation both the first (S1) and the second (S2) series impedance means are kept in their state of high impedance value;
  c. switching the first (S1) and (S2) series impedance means to their state of low impedance value before optionally removing the first cable between the first point and the second point,
wherein both the first (S1) and the second (S2) series impedance means are impedance inducing means allowing induction of an impedance within a range from a low impedance value to a high impedance value without cutting through the second cable (2).

18 Claims, 3 Drawing Sheets

fig-1a (PRIOR ART)
fig-1b (PRIOR ART)
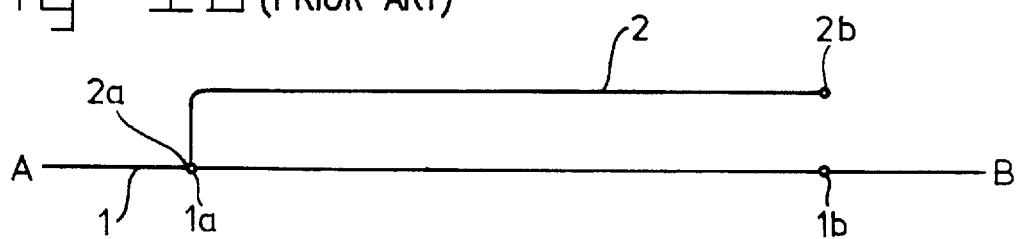
fig-1c (PRIOR ART)
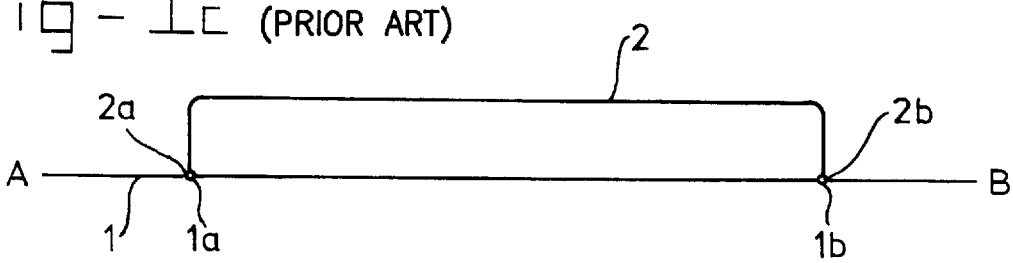
fig-1d (PRIOR ART)
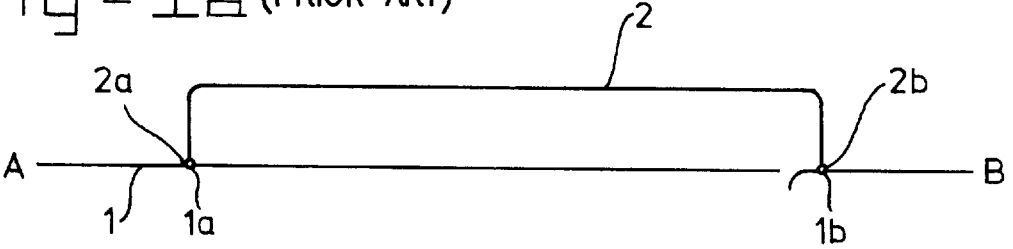
fig-1e (PRIOR ART)
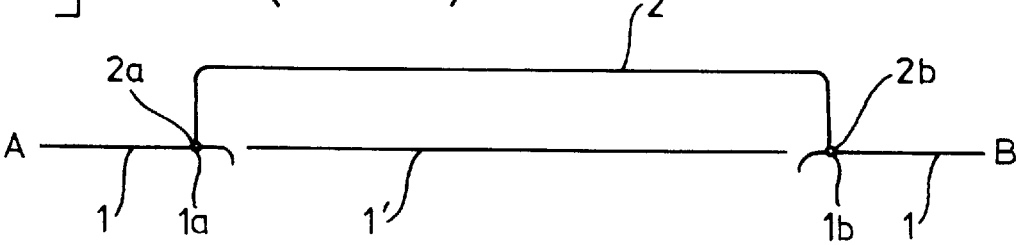

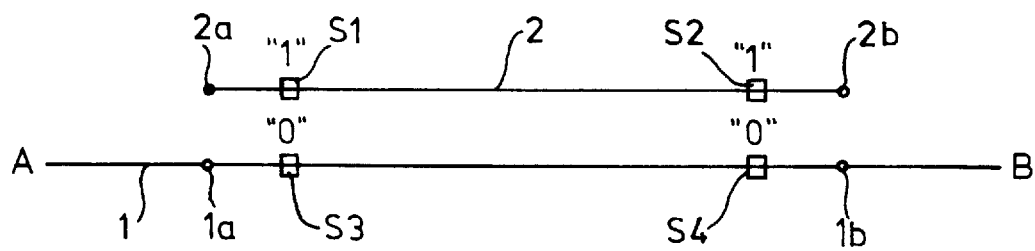
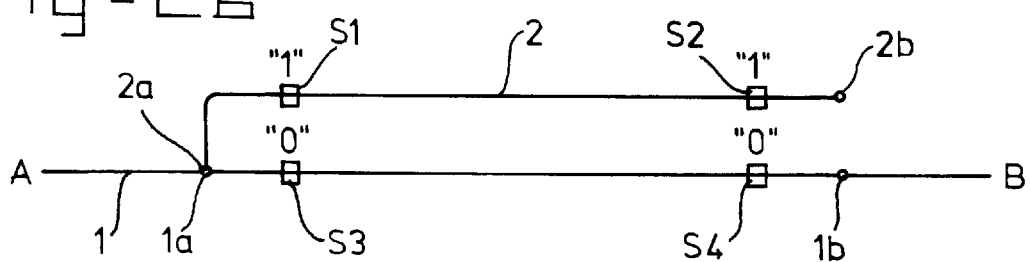
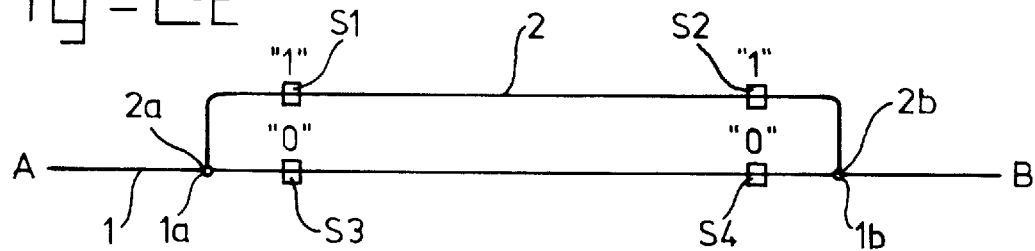
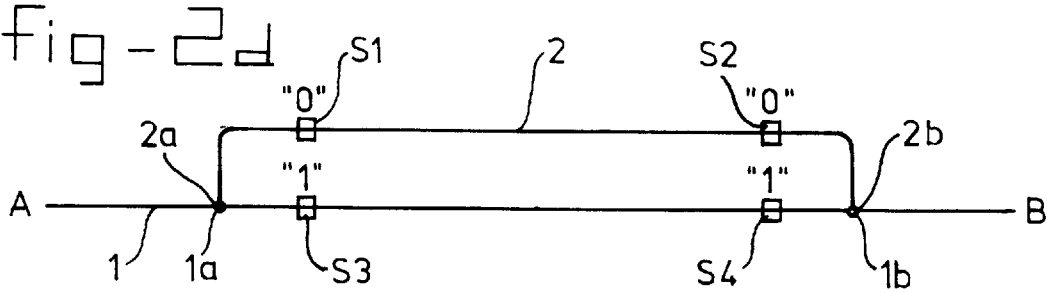
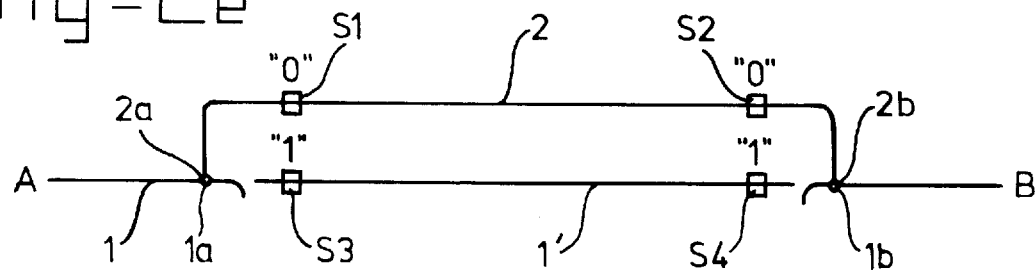

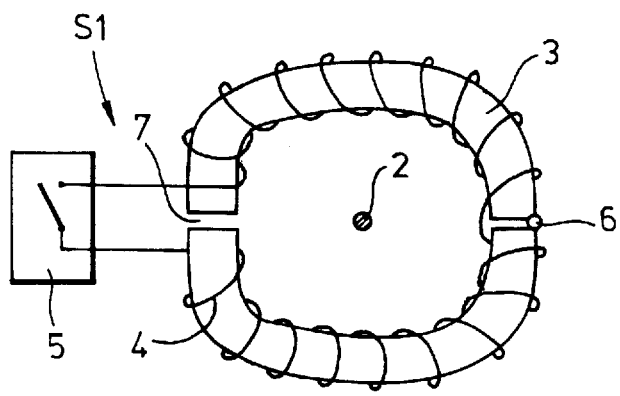
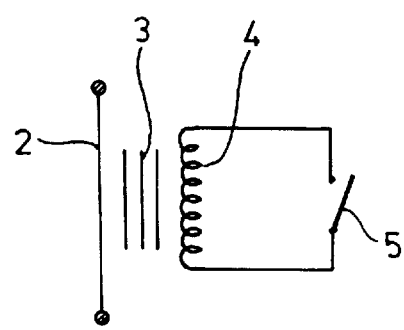
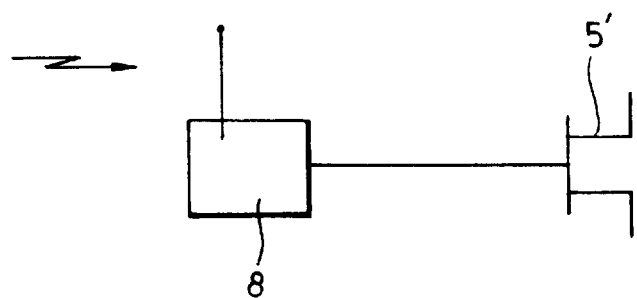

METHOD FOR REPLACING AN ELECTRICALLY CONDUCTING CABLE BY ANOTHER ELECTRICALLY CONDUCTING CABLE

BACKGROUND OF THE INVENTION

The present invention relates to a method for replacing a first cable provided with at least one electrical conductor by a second cable provided with at least one electrical conductor between a first predetermined point and a second predetermined point of the first cable, comprising the following steps:

a. providing the second cable with a first end thereof in the vicinity of the first point, the first end being provided with a first series impedance means switchable between states of high and low impedance value;

b. providing the second cable with a second end thereof in the vicinity of the second point, the second end being provided with a second series impedance means switchable between states of high and low impedance value;

c. electrically connecting the at least one conductor of the second cable at the first end to a predetermined conductor of the first cable at the first point while keeping the first impedance means in a state of high impedance and electrically connecting the at least one conductor of the second cable at the second end to the predetermined conductor of the first cable at the second point while keeping the second impedance means in a state of high impedance;

d. substantially simultaneously switching the first series impedance means to a state of low impedance and the second series impedance means to a state of low impedance value;

e. cutting through the first cable between the first point and the second point at a location near the first point and another location near the second point.

Such a method is known from Electronics & Communications in Japan, part II, Electronics, part 71, Nr. 7, part 02, Jul. 1, 1988, pages 84–93, Naohisa Komatsu et al.: "Technology of cable transfer system for error-free digital transmission".

The problem which is solved by the present invention will be explained with reference to FIGS. 1a to 1e. When work is carried out on operational telecommunications cables, existing cables frequently have to be replaced by new cables. The conventional method for this is substantially to remove the existing cable except for a few connecting pieces and then to fit a new cable between these connecting pieces. The problem with this is that active telecommunications connections are interrupted as a result. This problem has, in principle, already been solved before by a method which is shown diagrammatically in FIGS. 1a to 1e.

FIG. 1a shows a telecommunications cable 1 between two communication points A and B, a section of which cable between points 1a and 1b has to be replaced by a new cable 2. FIG. 1a shows cable 2, which has two cable ends 2a, 2b, loose alongside cable 1.

FIG. 1b shows that in a first method step cable end 2a is connected to point 1a. The cables 1, 2 are shown diagrammatically. However, it must be understood that the cables can each contain tens, if not hundreds, of cores or core pairs. An engineer has to expose all of these cores and will therefore be working for some time to connect all cores of cables 1 and 2 with one another at point 1a. During this entire time cable end 2b is still not connected to cable 1.

Once the engineer has finished, he moves to point 1b and there connects cable end 2b to cable 1 following the same procedure as at point 1a. This situation is shown in FIG. 1c, from which it can be seen that points 1a and 1b are connected via two parallel communication cables 1 and 2.

FIG. 1d shows that the engineer then cuts through cable 1 at a point which is close to point 1b and is located between points 1a and 1b, so that only the communication link via cable 2 remains intact. He then moves to point 1a in order there also to cut through cable 1 at a point between points 1a and 1b, as is shown in FIG. 1e. The latter figure shows that a cut-through section 1' of cable 1 remains between points 1a and 1b. Section 1' can then be removed as desired.

It will be clear that with the method illustrated in FIGS. 1a to 1e the communication link between points A and B is never broken.

However, with the method shown in FIGS. 1a to 1e problems occur at two points in time with respect to, in particular, broadband signals, which are transmitted at high speed, for example at more than 1 MB/s, between points A and B. These points in time are shown in FIGS. 1b and 1d. It can be seen from FIG. 1b that cable 2 is connected by one or more cores to cable 1 at point 1a, whilst cable end 2b is still open. Especially in the case of broadband signals which are transmitted via cores of cable 1 which have already been connected to corresponding cores of cable 2, undesirable reflections then occur in the cores of cable 2. This can give rise to dips in the transmission. In practice it is found that this can cause interference in modems. The consequence can even be communication failure. These problems also arise in the situation according to FIG. 1d, although it is then not cable 2 which produces the reflections but the section of cable 1 between points 1a and 1b which at that point in time has been cut through on one side only.

In practice, points 1a and 1b are often at least a few tens of meter apart. It would already be possible appreciably to shorten the duration of the undesirable situation by having two engineers working simultaneously at points 1a and 1b, who are able to communicate with one another so that they work as far as possible on the same core pairs at the same time. By this means the undesirable situation per core pair would be limited appreciably. However, even then some delay between making and breaking the connections at points 1a and 1b is still unavoidable.

The prior art disclosed by Komatsu et al. referred to above discloses a method and devices for providing series impedances at those locations of the cable to be replaced that need to be cut through after the latter cable is replaced by a new cable. The known method is carried out by devices comprising switches that can be controlled remotely. A first switch is arranged to bypass a first location in the cable to be replaced which first location needs to be cut through. A second switch is arranged to bypass a second location in the cable to be replaced which second location needs to be cut through. The devices used comprise two further switches and a resistor thus forming a pair transfer circuit, which is also to be connected to the ends of the new cable. Any of the conductors of the old cable to be replaced and the new cable need to be connected to pair transfer circuits of this type. Although the method and the device described by Komatsu et al. overcome the problems related to the method illustrated with reference to FIGS. 1a to 1e, they are still complex and there is a need for simplification.

SUMMARY OF THE INVENTION

The aim of the present invention is, therefore, to provide a method and means with which a first electrically conducting cable can be replaced by a second electrically conducting cable, with which an active connection to the first cable is not broken and connection of the second cable results in substantially no interference to high frequency signals, which method and means are simple compared with the prior art.

This aim is achieved by a method of the type mentioned in the preamble, characterized in that both the first and the second series impedance means are impedance inducing means allowing induction of an impedance within a range from a low impedance value to a high impedance value without cutting through the second cable.

Here, "induction" is to be understood in a broad sense, i.e., induction refers to any act or process of causing a desired impedance value to occur in a cable which includes electromagnetic induction. However, changing an impedance value in a piece of conductor may, theoretically, also be achieved by rising or lowering the temperature of that piece. So, inducing a desired impedance value may also be achieved by temperature control.

It is observed that "switching" between states of high and low impedance is intended to include changing impedance values gradually.

As a result of the use of such series impedance means, only very short sections of the second cable will be detectable, from the electrical standpoint, at the points in the first cable where the cores of the relevant conductors have been exposed and connected to the cores of the second cable, as long as the series impedance means in the second cable are kept in their state of high impedance value. Consequently, troublesome reflections no longer occur at the points while work is being carried out to connect conductors of the first and second cables with one another. When the work is complete, the series impedance means are switched to their state of low impedance value, so that the second cable temporarily forms a parallel branch to the first cable. The section of the first cable between the two the points can then be removed.

With this method, switching of the first and second series impedance means to their state of low impedance value prior to step c takes place substantially simultaneously. Simultaneous switching avoids the situation where a substantial section of the second cable is, from the electrical standpoint, temporarily detectable from either the first or the second point in the first cable, which could temporarily give rise to interference.

The method according to the present invention is much simpler than the method described in the publication of Komatsu referred to above in that it does not need to connect any additional means to either the first or the second cable to induce the states of high and low impedance value, which means need to form a bridge across the points of the first cable to be cut through and are to be disconnected afterwards.

In a further embodiment of the method according to the invention, furthermore at least prior to step e the following steps are taken:

providing third series impedance means and fourth series impedance means in the first cable between the first point and the second point, which third impedance means are provided in the vicinity of the first point and which fourth impedance means are provided in the vicinity of the second point, both the third and fourth series impedance means being impedance inducing means allowing induction of an impedance within a range from a low impedance value to a high impedance value without cutting through the first cable;

prior to step e both the third and the fourth series impedance means are kept in their states of low impedance value;

prior to step e, but after the first and second series impedance means have been switched to their states of low impedance values, both the third and the fourth series impedance means are switched to their states of high impedance value.

For the same reasons as to why the first and second series impedance means are preferably switched simultaneously, the third and fourth series impedance means are also preferably switched to their state of high impedance value substantially simultaneously prior to step e.

The invention also relates to a device for inducing a series impedance in a cable provided with at least one electrical conductor, which series impedance can be varied between a state of high impedance value and a state of low impedance value and vice versa and comprises a coil arranged as a secondary winding of a transformer, the ends of which coil are connected to a switch. The method can advantageously be carried out using a device of this type. Such a device can be used to induce either low or high series impedance values in several parallel conductors in a cable at the same time, just by putting the device in the vicinity of the conductors. This is much simpler than the device used in the prior art disclosed in the article of Komatsu et al referred to above, which needs several physical connections to any of the conductors of the first cable to be replaced and to the conductors of the second, new cable.

The switch in the device according to the invention can be a switch which can be operated remotely. The remote operation can, for example, be by means of control signals transmitted via electrical or glass fibre cables or by means of control signals transmitted radiographically. By this means it is easily possible for two or more such series impedances located a distance apart to be switched simultaneously from their one series impedance value to their other series impedance value.

BRIEF DESCRIPTION OF THE DRAWINGS

The invention will be explained in more detail below with reference to a few figures which are intended for illustrative purposes and not as a restriction of the invention.

FIGS. 1a to 1e illustrate a method according to the prior art for replacing one cable having electrical conductors by another cable having electrical conductors;

FIGS. 2a to 2e illustrate a method according to the invention for replacing one cable having electrical conductors by another cable having electrical conductors;

FIG. 3a shows a device for inducing a high series impedance in a cable;

FIG. 3b shows an equivalent electrical circuit of the device according to FIG. 3a.

FIG. 4 shows a remotely controlled switch.

In FIGS. 2a to 2e, 3a and 3b the same reference numerals are used for the same elements as in FIGS. 1a to 1e.

DETAILED DESCRIPTION OF THE EMBODIMENTS

FIG. 2a shows the situation where the new cable 2, to be fitted, is provided parallel to cable 1 between the points 1a and 1b. The difference compared with FIG. 1a is, however, that a series impedance S1 and a series impedance S2 are incorporated in cable 2. Series impedance S1 is located close to cable end 2a, whilst series impedance S2 is located close to cable end 2b. Each of the series impedances S1, S2 is equipped such that the series impedance can vary in impedance between a high and a low value. Preferably, a low impedance value approaches zero and a high impedance value approaches ∞ within a predetermined frequency range. Suitable means for this will be described with reference to FIGS. 3a and 3b.

The symbol "1", which indicates a state of high series impedance, is shown next to series impedances S1, S2 in FIG. 2a.

Two series impedances S3 and S4 are preferably also used between the points 1a and 1b in cable 1, series impedance S3 being located close to point 1a and series impedance S4 being located close to point 1b. The requirement in respect of series impedances S3 and S4 is that they can be fitted to cable 1 without cable 1 having to be broken for this purpose, so that there is no interference with transmissions taking place. This can be effected with the aid of means which produce inductance, as will be explained below with reference to FIGS. 3a and 3b.

In FIG. 2a the series impedances S3 and S4 have the symbol "0", which indicates a low series impedance. In other words, the signals on cable 1 are transmitted unattenuated by series impedances S3 and S4.

FIG. 2b shows the following step in which the relevant core pairs of cable 2 are electrically connected at cable end 2a with the relevant exposed core pairs of cable 1. Because series impedance S1 with a high impedance value is present close to cable end 2a, point 1a will, from the electrical standpoint, be connected only to a very short section of the total length of cable 2, namely the section between cable end 2a and series impedance S1. As a result hardly any troublesome reflections occur and there will be hardly any disturbance of the signals on cable 1.

FIG. 2c shows the step in which the respective core pairs of cable end 2b are connected to the respective exposed core pairs of cable 1 at point 1b. As series impedance S2 is also kept in the state of high impedance during this operation, point 1b would also, from the electrical standpoint, be connected only to a very short section of cable 2. Therefore, at point 1b as well no troublesome reflections arise for signals on cable 1 and there will be virtually no interference of signal transmission at point 1b.

It will be clear that it is possible to work at points 1a and 1b at the same time or successively without this making any difference from the electrical standpoint. The only condition is that both series impedance S1 and series impedance S2 are kept in the state of high impedance.

After all desired core pairs of cables 1 and 2 have been connected to one another both at point 1a and at point 1b, both series impedance S1 and series impedance S2 are switched to the state of low impedance. If series impedance S1 is switched over later than series impedance S2, troublesome reflections could arise at point 1b in the intervening period. The same is true of point 1a if series impedance S2 is switched over later than series impedance S1. Consequently, it is important that switching of series impedances S1 and S2 from the state of high impedance to that of low impedance takes place simultaneously as far as possible. If different engineers are working simultaneously at points 1a and 1b, this can be effected by communication between these engineers. However, it is best if the series impedances can be controlled electrically or radiographically from one point, so that they can be switched simultaneously by one person from the one impedance value to the other.

At that point in time, signals can be transmitted between A and B both via cable 1 and via cable 2. Series impedances S3 and S4 are then switched to the state of high impedance, which state is shown in FIG. 2d. To avoid a substantial portion of cable 1 being connected for some time either to point 1a or to point 1b and being able to give rise to interference via reflections, series impedances S3 and S4 are preferably also switched simultaneously. It is also possible for all series impedances S1, S2, S3 and S4 to be switched virtually simultaneously provided that series impedances S3 and S4 switch slightly later than series impedances S1 and S2, because the signal path via cable 1 must not be interrupted during the period when it has not yet been established via cable 2. This switching can be effected, for example, via one electrical or radiographic instruction given by one engineer, the instruction for series impedances S3 and S4 being delayed by a fixed delay time.

Cable 1 can then be cut through between point 1a and series impedance S3 and between point 1b and series impedance S4 and the section 1' which has been cut free can be removed as desired. This is shown diagrammatically in FIG. 2e.

It is pointed out that series impedances S3 and S4 can optionally be omitted. To prevent troublesome reflections in the section of the cable 1 between points 1a and 1b, cable 1 must then, however, be cut through as simultaneously as possible at points 1a and 1b, after cable 2 has been fitted parallel to cable 1 and series impedances S1 and S2 have been switched to the state of low impedance value (situation corresponding to FIG. 2d). This procedure requires engineers working simultaneously at points 1a and 1b who, via the necessary communications equipment, synchronize cutting-through as far as possible. Since cutting through is done by hand, such synchronization can never be perfect and it will therefore be possible for interference nevertheless to arise in the time which elapses between cutting through at point 1a and at point 1b. As series impedances S3 and S4 can be switched simultaneously via electronic or radiographic means, the use of such means is to be preferred.

In principle, it is conceivable that the series impedances S1 and S2 consist of switches, which initially are open (state "1") and later (FIG. 2d) are closed (state "0") and are then kept definitively closed. It is conceivable to realise an embodiment of this type using existing semiconductor techniques. However, this is expensive because the switches can subsequently no longer easily be removed from cable 2. Furthermore, such switches can certainly not be used for series impedances S3 and S4 because they would already necessitate the cutting through of cable 1.

It is therefore desirable to be able to perform the method described above using means which can be fitted in a non-destructive manner to a predetermined point in a cable and there are able temporarily to induce, as desired, a series impedance with variable impedance value in the cable and which can be removed on completion of the method, once again in a non-destructive manner. This can be carried out according to the invention with the device shown in FIG. 3a.

FIG. 3a shows a conductor which has been wound as a coil 4 around a core 3 of suitable material and which is connected at both of its ends to a switch 5. The core 3 consists of two semicircles which are joined to one another via a hinge 6. The two halves of the core 3 can be moved away from and towards one another at the point opposite the hinge 6. Therefore a cable, for example the new cable 2, can be fed through the circular core 3. The device indicated by reference numerals 3, 4, 5 and 6 forms one series impedance, for example S1. The hinge 6 can be replaced by any other means for folding open or folding apart the core halves.

Although the core 3 has been shown here with two circular halves, the halves do not have to be circular, provided they are able to form a magnetically closed circuit. The core can also consist of more than two parts. For use with cable 2, core 3 can optionally also consist of a ferrite bead, which is pushed over cable 2 and is destroyed to obtain the state of low impedance value. To summarise, core 3 can consist of one or more parts, which parts can assume a magnetically closed and a magnetically open state. Switch 5 may be replaced by any other switching circuit able to short circuit coil 4 either by sudden or gradual switching. Switch 5 may, e.g., be replaced by a sliding resistance.

FIG. 3*b* shows an equivalent electrical circuit of the arrangement according to FIG. 3*a*. In this circuit cable 2 is the primary "winding" of a transformer which has core 3 and secondary winding 4. With the aid of switch 5, it is possible either to remove the power from or to short-circuit the secondary winding. If switch 5 is closed there is a minimum impedance between the terminals of the primary "winding" and if switch 5 is open there is maximum impedance between the terminals of said winding. By operating switch 5 it is therefore possible to induce a series impedance which has either a high or a low impedance value at a specific desired point in cable 2. Switch 5 can be a manually operated switch. However, to enable two or more series impedances to be switched simultaneously, it is preferable to be able to control switch 5 remotely. To this end, switch 5 can, for example, be constructed as a transistor, which can be controlled remotely either via a suitable control signal via an electric cable or glass fibre cable or via a radiographic signal which is converted by a suitable receiver into an electric signal. Alternatively, a control signal of this type can also be transmitted acoustically or optically (through the air). A mechanical construction is also possible. If the control signal is transmitted via an electric cable, this transmission can be effected via cable 1 or 2, in which case the coil 4, which is in any case already present, can be used to apply the control signal to the cable 1, 2. A switch 5 which can be operated radiographically is shown diagrammatically in FIG. 4. A receiver 8 is equipped to receive a suitable control signal and to convert the latter into an electrical control signal for the gate electrode of MOS transistor 5', which serves as switch 5. Of course, switch 5 does not have to be a MOS transistor. The only condition is that switch 5 can switch between a state of low impedance (not necessarily 0Ω) and a state of high impedance (not necessarily∞Ω), either by sudden or gradual switching.

As an alternative to the device shown in FIG. 3*a*, it is possible to use a device from which switch 5 and the conductor 4, wound as a coil, have been removed. In a device of this type the state in which the two halves of the core 3 are folded together (that is to say gap 7 has been reduced to zero) then corresponds to a series impedance of maximum impedance value. By either folding the two halves of the core 3 away from one another or increasing the gap 7 from zero to a predetermined value or removing the core as a whole, said state of maximum series impedance value can be switched to a state of low impedance value. However, this necessitates movements of mechanical parts and, although these could be controlled remotely, they are less practical than remote control of switch 5.

It will be clear that the method described above is not restricted to use of one of the devices described. Any other device with which a series impedance can be produced in a cable and the impedance of which can be switched between a high and a low value and vice versa is, in principle, suitable for this purpose.

I claim:

1. A method for replacing a first cable (1) provided with at least one electrical first conductor by a second cable (2) provided with at least one electrical second conductor between a first point (1*a*) and a second point (1*b*) of the first cable, comprising the steps of:

a) providing the second cable (2) with a first end (2*a*) thereof in the vicinity of the first point (1*a*), said first end (2*a*) being provided with a first impedance means (S1) switchable between a state of a first high impedance value and a state of a first low impedance value, said first high impedance value being higher than said first low impedance value;

b) providing the second cable (2) with a second end (2*b*) thereof in the vicinity of the second point (1*b*), said second end (2*b*) being provided with a second impedance means (S2) switchable between a state of a second high impedance value and a state of a second low impedance value, said second high impedance value being higher than said second low impedance value;

c) electrically connecting said second conductor of the second cable at the first end (2*a*) to said first conductor of the first cable (1) at the first point (1*a*) while keeping said first impedance means (S1) in said state of said first high impedance value and electrically connecting said second conductor of the second cable at the second end (2*b*) to said first conductor of the first cable (1) at the second point (1*b*) while keeping said second impedance means (S2) in said state of said second high impedance value;

d) substantially simultaneously switching said first impedance means (S1) to said state of said first low impedance value and said second impedance means (S2) to said state of said second low impedance value; and e) cutting through the first cable (1) between said first point (1*a*) and said second point (1*b*) at a location near the first point (1*a*) and another location near the second point (1*b*), wherein said first impedance means (S1) is an impedance inducing means allowing induction of a first impedance in said second cable (2) which is switchable between said first low impedance value and said first high impedance value without cutting through said second cable (2), and wherein said second impedance means (S2) is an impedance inducing means allowing induction of a second impedance in said second cable (2) which is switchable between said second low impedance value and said second high impedance value without cutting through said second cable (2).

2. The method according to claim 1, wherein, prior to step e) the following steps are taken:

providing third impedance means (S3) and fourth impedance means (S4) in the first cable between said first point (1*a*) and said second point (1*b*), which third impedance means (S3) is provided close to the first point (1*a*) and which fourth impedance means (S4) is provided close to the second point (1*b*), said third impedance means (S3) being impedance inducing means allowing induction of a third impedance in said first cable (1) which is switchable between a state of a third low impedance value and a state of a third high impedance value without cutting through said first cable (1), said third high impedance value being higher than said third low impedance value, said fourth impedance means (S4) being impedance inducing means allowing induction of a fourth impedance in said first cable (1) which is switchable between a state of a fourth low impedance value and a state of a fourth high impedance value without cutting through said first cable (1), said fourth high impedance value being higher than said fourth low impedance value;

prior to step e) both the third (S3) and the fourth (S4) impedance means, respectively, are kept in said states of said third and fourth low impedance value, respectively;

prior to step e), but after the first (S1) and second (S2) impedance means, respectively, have been switched to said states of said first and second low impedance value, respectively, both the third (S3) and the fourth (S4) impedance means, respectively, are switched to said states of said third and fourth high impedance value, respectively.

3. The method according to claim 2, wherein switching of the third (S3) and the fourth (S4) impedance means, respectively, to said states of said third and fourth high impedance value, respectively, takes place substantially simultaneously.

4. The method according to claim 2, wherein at least one of the first and second impedance means (S1, S2) comprises a ferrite bead.

5. The method according to claim 1, wherein at least one of the third and fourth impedance means (S3, S4) comprises a core (3) comprising at least two parts connected to each other by a hinge (6), said core (3) being constructed such that it can be changed from a magnetically closed state to a magnetically open state, and that, in its magnetically closed state, said core encloses a cavity for guiding through said first cable.

6. The method according to claim 2, wherein at least one of the third and fourth impedance means (S3, S4) comprises a ferrite bead.

7. The method according to claim 2, wherein at least one of the third and fourth impedance means (S3, S4) comprises a second coil (4) arranged as a secondary winding of a second transformer, which second coil is connected in series to a second switch (5).

8. The method according to claim 7, wherein the second switch (5) can be operated remotely.

9. The method according to claim 7, wherein said second coil is wound about a second core (3) comprising at least two parts connected to each other by a second hinge (6), said second core (3) being constructed such that it can be changed from a magnetically closed state to a magnetically open state, and that, in its magnetically closed state, said second core encloses a second cavity for guiding through said first cable.

10. The method according to claim 1, wherein at least one of the first and second impedance means (S1, S2) comprises a first coil (4) arranged as a secondary winding of a first transformer, which first coil is connected in series to a first switch (5).

11. The method according to claim 10, wherein the first switch (5) can be operated remotely.

12. The method according to claim 10, wherein said first coil is wound about a first core (3) comprising at least two parts connected to each other by a first hinge (6), said first core (3) being constructed such that it can be changed from a magnetically closed state to a magnetically open state, and that, in its magnetically closed state, said first core encloses a first cavity for guiding through said second cable.

13. The method according to claim 1, wherein at least one of the first and second impedance means (S1, S2) comprises a core (3) comprising at least two parts connected to each other by a hinge (6), said core (3) being constructed such that it can be changed from a magnetically closed state to a magnetically open state, and that, in its magnetically closed state, said core encloses a cavity for guiding through said first cable.

14. The method according to claim 1, wherein said first impedance means operates to induce said first impedance in said second cable while remaining contact-free of said second cable.

15. A method for replacing a first electric cable (1) provided with a first conductor, by second electric cable (2) provided with a second conductor, between a first point (1a) and a second point (1b) of the first cable, comprising the steps of:

a) providing the second cable (2) with a first end (2a) thereof in the vicinity of the first point (1a), said first end (2a) being provided with a first series impedance means (S1) switchable between a state of a first high impedance value and a state of a first low impedance value, said first high impedance value being higher than said first low impedance value;

b) providing the second cable (2) with a second end (2b) thereof in the vicinity of the second point (1b), said second end (2b) being provided with a second series impedance means (S2) switchable between a state of a second high impedance value and a state of a second low impedance value, said second high impedance value being higher than said second low impedance value, wherein said first series impedance means (S1) is an impedance inducing means allowing induction of a first impedance in said second cable (2) which is switchable between said first low impedance value and said first high impedance value without cutting through said second cable (2), and wherein said second series impedance means (S2) is an impedance inducing means allowing induction of a second impedance in said second cable (2) which is switchable between said second low impedance value and said second high impedance value without cutting through said second cable (2);

c) electrically connecting said second conductor at the first end (2a) to said first conductor at the first point (1a) while keeping said first series impedance means (S1) in said state of said first high impedance value and electrically connecting said second conductor at the second end (2b) to said first conductor at the second point (1b) while keeping said second series impedance means (S2) in said state of said second high impedance value;

d) prior to step e), providing third series impedance means (S3) and fourth series impedance means (S4) in the first cable between said first point (1a) and said second point (1b), which third impedance means (S3) is provided close to the first point (1a) and which fourth impedance means (S4) is provided close to the second point (1b), said third series impedance means (S3) being impedance inducing means allowing induction of a third impedance in said first cable (1) which is switchable between a state of a third low impedance value and a state of a third high impedance value without cutting through said first cable (1), said third high impedance value being higher than said third low impedance value, said fourth series impedance means (S4) being impedance inducing means allowing induction of a fourth impedance in said first cable (1) which is switchable between a state of a fourth low impedance value and a state of a fourth high impedance value without cutting through said first cable (1), said fourth high impedance value being higher than said fourth low impedance value, wherein at least one of the third and fourth series impedance means (S3, S4) comprises a coil (4) arranged as a secondary winding of a transformer, which coil is connected in series to a switch (5), and wherein both the third (S3) and the fourth (S4) series impedance means, respectively, are kept in said states of said third and fourth low impedance value, respectively, prior to step e);

e) substantially simultaneously switching said first series impedance means (S1) to said state of said first low impedance value and said second series impedance means (S2) to said state of said second low impedance value;

f) after step e), switching both the third (S3) and the fourth (S4) series impedance means, respectively, to said states of said third and fourth high impedance value, respectively; and g) cutting through the first cable (1) between said first point (1a) and said second point (1b) at a location near the first point (1a) and another location near the second point (1b).

16. The method of claim 15, wherein the switch (5) can be operated remotely.

17. A method for replacing a first electric cable (1) provided with a first conductor, by a second electric cable (2) provided with a second conductor, between a first point (1a) and a second point (1b) of the first cable, comprising the steps of:

a) providing the second cable (2) with a first end (2a) thereof in the vicinity of the first point (1a), said first end (2a) being provided with a first series impedance means (S1) switchable between a state of a first high impedance value and a state of a first low impedance value, said first high impedance value being higher than said first low impedance value;

b) providing the second cable (2) with a second end (2b) thereof in the vicinity of the second point (1b), said second end (2b) being provided with a second series impedance means (S2) switchable between a state of a second high impedance value and a state of a second low impedance value, said second high impedance value being higher than said second low impedance value;

c) electrically connecting said second conductor of the second cable at the first end (2a) to said first conductor at the first point (1a) while keeping said first series impedance means (S1) in said state of said first high impedance value and electrically connecting said second conductor at the second end (2b) to said first conductor at the second point (1b) while keeping said second series impedance means (S2) in said state of said second high impedance value;

d) substantially simultaneously switching said first series impedance means (S1) to said state of said first low impedance value and said second impedance means (S2) to said state of said second low impedance value; and e) cutting through the first cable (1) between said first point (1a) and said second point (1b) at a location near the first point (1a) and another location near the second point (1b), wherein said first series impedance means (S1) is an impedance inducing means allowing induction of a first impedance in said second cable (2) which is switchable between said first low impedance value and said first high impedance value without cutting through said second cable (2), and wherein said second series impedance means (S2) is an impedance inducing means allowing induction of a second impedance in said second cable (2) which is switchable between said second low impedance value and said second high impedance value without cutting through said second cable (2), and wherein at least one of the first and second series impedance means (S1, S2) comprises a coil (4) arranged as a secondary winding of a transformer, which coil is connected in series to a switch (5).

18. The method according to claim 17, wherein the switch (5) can be operated remotely.

\* \* \* \* \*